Patented Jan. 26, 1954

2,667,480

UNITED STATES PATENT OFFICE 2,667,480

MANUFACTURE OF CELLULOSE ETHER

Wiley Monroe Branan and Gild Edward Desetti, Penns Grove, N. J., assignors to E. I. du Pont de Nemours & Company, Wilmington, Del., a corporation of Delaware No Drawing. Application July 5, 1950, Serial No. 172,198

10 Claims. (Cl. 260—231)

The present invention relates to a process for the manufacture of cellulose ethers, and more particularly, to an improved process for the preparation of the alkali salts of carboxyalkyl cellulose.

The alkali salts of carboxyalkyl cellulose, such as sodium carboxymethyl cellulose, are prepared by the reaction of caustic alkali and cellulose to produce alkali cellulose, and the further treatment of the alkali cellulose with an etherifying agent such as a halogenated fatty acid or the alkali salt thereof.

In general, the commercial procedure for the manufacture of sodium carboxymethyl cellulose has been to intermingle the ingredients in a suitable vessel, such as, for example, a Werner-Pfleiderer mixer, followed by the removal of the resultant mixture to a closed system where it is stored at constant temperature in a static condition while the reaction goes on to completion. This latter step, known to the art as "aging," varies in time from several hours up to several days, depending on whether or not the constant temperature was considerably elevated above atmospheric temperature. After completion of the "aging" period, the reacted material is generally disintegrated mechanically in order to reduce the material to particles which can be dried.

It is an obvious disadvantage to any commercial process to require constant temperature storage of material for long periods of time. The mechanical disintegration of the mass prior to drying is another disadvantage which adds to the ultimate cost of the material. Various attempts have been made to eliminate the above disadvantages, such as, for example, heating the mixture while it is still in the mixer in order to carry the reaction to completion while mechanical action is being exerted on the material. It is known that by increasing the temperature on the reaction mixture to about 80° C. following uniform distribution of the ingredients, and while mixing the mass, the reaction goes more rapidly to completion. In order to obtain a uniform distribution of the ingredients, a liquid medium is invariably used. The most common liquid medium is, of course, water. However, when water is used as a medium and the reaction mixture is heated in the mixer during agitation a gummy mass results, due to the solubility of sodium carboxymethyl cellulose. This gummy mass cannot be dissolved in water as rapidly as can the more porous forms of the ether, the drying of the material is considerably complicated, and the removal of the salts present as by-products of the reaction is rendered extremely difficult.

Attempts to overcome the aforementioned objections have largely been in the nature of the utilization of an organic medium in which the sodium carboxymethyl cellulose is not soluble, as the distributing agents for the reactants. While these attempts have been partially successful in preventing the formation of the undesirable gummy mass, new undesirable features have also been introduced. The organic liquids used have been flammable and form explosive mixtures with air. Their use, therefore, necessitates the taking of elaborate precautions to prevent accidental explosions. In addition, the adoption of such a medium has the further disadvantage of adding a costly ingredient which must either be lost or recovered by the use of additional apparatus and working time.

An object of the present invention is an improved process for producing the sodium salt of carboxymethyl cellulose. Another object is a process for producing sodium carboxymethyl cellulose which does not require long reaction periods. A further object is an improved process for producing sodium carboxymethyl cellulose which does not require the use of an organic medium. A still further object is an improved process for making sodium carboxymethyl cellulose which eliminates the need for breaking up the material prior to drying. A still further object is a process wherein the etherification reaction proceeds simultaneously with a reduction in the volatiles content of the reaction mass. Other objects will become apparent as the invention is described hereinafter.

We have found that the foregoing objects are obtained when we thoroughly intermingle an etherifying agent and alkali cellulose at a temperature below that at which substantial etherification occurs, and then reduce the mixture to substantial dryness by removal of the volatile components at elevated temperatures. During the removal of the volatiles at elevated temperatures, the etherification of the alkali cellulose is promoted and has been found to be substantially complete by the time the volatiles have been satisfactorily removed. For the purposes of the present invention, the commercial definition of substantially dry alkali carboxymethyl cellulose is used, e. g., having a water content of less than 10% by weight.

In carrying out the process of the present invention, the formation of the alkali cellulose may be effected in a mixer such as a Werner-Pfleiderer mixer by simply bringing into contact the caustic alkali solution and the purified cellulose in the desired proportions while mechanically agitating them. The heat evolved by the reaction is desirably removed by passing a coolant through the mixer jacket. The etherifying agent is then added and the agitation of the ingredients continued until uniform distribution has been obtained. During the addition and mixing of the etherifying agent, the temperature of the reaction mass is not permitted to reach that at which substantial etherification occurs. Heat evolved due to neutralization of an etherifying acid is removed in a manner similar to that used to remove the heat formed by the reaction of the alkali on the cellulose. After mixing of the ingredients is complete, the temperature of the mixture is elevated to promote the etherification reaction, and, at the same time, evolve the volatile components of the reaction mixture. This can readily be accomplished by feeding the mixture through a heated rotary tube dryer of sufficient length to permit substantially complete drying prior to discharge of the dried cellulose ether. The resulting product may then be milled to break apart any particle agglomerates.

The cellulose used may vary in physical form and may include shredded wood pulp or linters wherein the cellulose has been torn or fluffed and where it retains its fibrous form, or it may be flocked by means of cutting knives to give fibrous particles of desired dimension. A preferred embodiment involves the use of purified cellulose in granular form having a bulk density of about 30 pounds per cubic foot, and having an average particle size of less than 150 microns.

It has been found that etherification of alkali cellulose by an etherifying agent such as monochloroacetic acid or the alkali salt thereof can be essentially arrested by maintaining the reaction mass at a temperature below 30° C. When the etherifying agent has been uniformly distributed in the reaction mixture maintained at a temperature below the etherification reaction temperature, the material is found to be light and fluffy. Samples of the material taken at this point when mixed with water do not increase the viscosity of the liquid such as is characteristic of aqueous solutions of sodium carboxymethyl cellulose.

When this material is heated, alkali carboxymethyl cellulose of excellent quality is obtained.

The efficiency of the etherification reaction under the conditions of the present invention is very good. The reaction efficiency is defined as the ratio of the degree of etherification actually obtained to the theoretical degree of etherification, multiplied by 100. Degree of etherification is used to mean the number of carboxymethyl units which have been added to the anhydroglucose unit of the cellulose molecule, whereas the theoretical degree of etherification (T. D. E.) is defined as the ratio of the mols of the etherifying agent to the mols of cellulose. These terms are used in accordance with these definitions throughout the present description.

Although the temperature of the mixture may be elevated over a rather wide range to promote the reaction rate, we prefer to stay within the range of 60–80° C. because this range yields optimum product quality and reaction efficiency. In addition, even though the simultaneous reaction and moisture removal may be effected in the static condition we prefer to impart motion to the material while reacting and drying it, because moisture removal is more efficient under these conditions and severe lumping and caking of the material is obviated, thereby minimizing the need for subsequent breaking up of the finished dry product. The range of 60–80° C. refers to the temperature of the reacting mass while free moisture is still present. Obviously, when the moisture content drops below the point where it gives effective cooling of the reactive mass, the temperature of the material will increase. The limiting temperature of the dry product is that at which the material becomes undesirably discolored or charred. Discoloration is, of course, dependent not only on a time-temperature relationship at which the material is exposed but it is also influenced by the specific formulation employed. Thus it is well known in the art that strongly alkaline materials will discolor more readily than those which are more nearly neutral.

The following examples are given as illustrations of the present invention in order to describe it more fully. They are intended to serve as specific embodiments only and not as limiting the invention.

*Example 1*

28¼ pounds of a 35 per cent aqueous solution of sodium hydroxide at 23° C. were placed in a 20 gallon Werner-Pfleiderer type mixer which was cooled by means of a brine solution at −14° C. circulating through the mixed jacket. 25 pounds of finely divided granular cellulosic material (bulk density 30 pounds per cubic foot) were then added and the mixture agitated for 15 minutes. 5¾ pounds of monochloroacetic acid were added and the mixing continued for 15 minutes. 5¾ pounds of monochloroacetic acid were added and the mixing continued 30 minutes after which the mixture was removed. The temperature of the charge at this time was 18° C. and the cellulosic portion of the mixture was insoluble in water. Immediately after removal of the material from the mixer, feeding of the mixture at a uniform rate of 35 pounds per hour was begun into a rotary steam tube drier (1′ diameter x 8′ length) heated by steam at 140° C. The hold up time in the drier was 30 minutes after which the product discharged at a uniform rate. The material was milled to break apart the particle agglomerates and reduce it to the form of the original cellulosic ingredient. The product was essentially completely soluble in water. It contained 1.2 per cent moisture and the sodium CMC content on a bone dry basis was 70.1 per cent.

The formulation was based on a T. D. E. of 0.83 or a ratio of monochloroacetic acid to bone dry cellulose of 0.484. The degree of etherification of the sodium carboxymethyl cellulose was 0.54 representing a reaction efficiency of 65.1 per cent.

*Example 2*

39⅞ pounds of a 35 per cent aqueous solution of sodium hydroxide at 20° C. were placed in a 20-gallon Werner-Pfleiderer type mixer which was cooled by means of a brine solution at −14°

C. circulating through the mixer jacket. 25 pounds of finely divided granular cellulosic material (bulk density 30 pounds per cubic foot) were then added and the mixture agitated for 15 minutes. 7 9/16 pounds of monochloroacetic acid were added and the mixing continued for 15 minutes. 7 9/16 pounds of monochloroacetic acid were added and the mixing continued 30 minutes after which the mixture was removed. The temperature of the charge at this time was 24° C. and the cellulosic portion of the mixture was insoluble in water. Immediately after removal of the material from the mixer, feeding of the mixture at a uniform rate of 35 pounds per hour was begun into a rotary steam tube drier (1' diameter 8' length) heated by steam at 140° C. The hold up time in the drier was 30 minutes after which the product discharged at a uniform rate. The material was milled to break apart the particle agglomerates and reduce it to the form of the original cellulosic ingredient. The product was essentially completely soluble in water. It contained 3.3 per cent moisture and the sodium CMC content on a bone dry basis was 65.5 per cent.

The formulation was based on a T. D. E. of 1.10 or a ratio of monochloroacetic acid to bone dry cellulose of 0.637. The degree of etherification of the sodium carboxymethyl cellulose was 0.71 representing a reaction efficiency of 64.6 per cent.

*Example 3*

54¼ pounds of a 35 per cent aqueous solution of sodium hydroxide at 18° C. were placed in a 20-gallon Werner-Pfleiderer type mixer which was cooled by means of a brine solution at —14° C. circulating through the mixer jacket. 25 pounds of finely divided granular cellulosic material (bulk density 30 pounds per cubic foot) were then added and the mixture agitated for 15 minutes. 9¾ pounds of monochloroacetic acid were added and the mixing continued for 15 minutes. 9¾ pounds of monochloroacetic acid were added and the mixing continued 30 minutes after which the mixture was removed. The temperature of the charge at this time was 27° C. and the cellulosic portion of the mixture was insoluble in water. Immediately after removal of the material from the mixer, the mixture was fed at a uniform rate of 35 pounds per hour into a rotary steam tube drier (1' diameter x 8' length) heated by steam at 140° C. The hold-up time in the drier was 30 minutes after which the product discharged at a uniform rate. The material was milled to break apart the particle agglomerates and reduce it to the form of the original cellulosic ingredient. The product was essentially completely soluble in water. It contained 5.3 per cent moisture and the sodium CMC content on a bone dry basis was 60.8 per cent.

The formulation was based on a T. D. E. of 1.40 or a ratio of monochloroacetic acid to bone dry cellulose of 0.822. The degree of etherification of the sodium CMC was 0.78 representing a reaction efficiency of 55.7 per cent.

It will be noted that in the foregoing examples the heat for promoting the etherification reaction is supplied indirectly by bringing the materials to be reacted in contact with a heated surface and permitting the moisture evolved to be removed by natural convection. If desirable, the mass to be reacted can be heated directly by passing hot air through it or by an induced draft which can also be used for more positive displacement of the moisture evolved. Such procedures provide uniform heating to the reaction mass. A certain amount of temperature rise will be obtained as a result of the etherification itself after the cooling of the reaction mixture is discontinued, but the application of additional heat is preferred in order to assure satisfactory evolution of the volatiles. Other modifications will be apparent to those skilled in the art. We intend therefore to be bound only by the following claims.

We claim:

1. A process for the preparation of water-soluble sodium carboxymethyl cellulose which comprises adding to water moistened alkali cellulose, at a temperature no higher than about 30° C. sufficient etherifying agent selected from the group consisting of monochloroacetic acid and sodium monochloroacetate to provide a degree of etherification which renders the product water-soluble, agitating the mass within the aforementioned temperature limit until thorough mixing is obtained and thereafter subjecting it to uniform heating at a temperature sufficient to cause concurrent etherification and water vaporization thereby producing a substantially dry, water-soluble product.

2. The process of claim 1 wherein uniform heating is accomplished by moving the reaction mass over a surface having a temperature sufficient to raise the temperature of the reaction mass to at least about 60° C.

3. The process of claim 2 wherein the temperature of the reaction mass during uniform heating is maintained between about 60° C. and the charring temperature of the reaction components.

4. The process of claim 3 wherein the quantity of etherifying agent is sufficient to provide a product having a degree of etherification between about 0.71 and 0.83.

5. A process as claimed in claim 3 wherein the average particle size of the cellulose is less than 150 microns.

6. A process as claimed in claim 5 wherein the heating is continued until the water content is less than 10% by weight of the total mass.

7. A process for the preparation of water-soluble sodium carboxymethyl cellulose which comprises the formation of water moistened alkali cellulose by the addition of purified cellulose to an aqueous solution of sodium hydroxide at a rate controlled to maintain the reaction temperature no higher than about 30° C. and thereafter within the aforementioned temperature limit, adding sufficient monochloroacetic acid to provide a product having a degree of etherification between about 0.71 and 0.83 and agitating the mass for a period of about 30 minutes to obtain thorough mixing and thereafter uniformly heating the mass during continued agitation upon a metal surface heated to a temperature of about 140° C. for a period of about 30 minutes to effect concurrent etherification and water vaporization thereby producing a substantially dry, water-soluble product.

8. The process of claim 7 wherein the unetherified reaction mass is maintained within a temperature range of from about 18° to about 23° C.

9. A process for the preparation of water-soluble sodium carboxymethyl cellulose which comprises the formation of water moistened alkali cellulose by the addition of purified cellulose to an aqueous solution of sodium hydroxide at a rate controlled to maintain the reaction temperature no higher than about 30° C. and thereafter within the aforementioned temperature limit, adding sufficient sodium monochloroacetate to provide a product having a degree of etherification between about 0.71 and 0.83 and agitating the mass for a period of about 30 minutes to obtain thorough mixing and thereafter uniformly heating the mass during continued agitation upon a metal surface heated to a temperature of about 140° C. for a period of about 30 minutes to effect concurrent etherification and water vaporization thereby producing a substantially dry, water-soluble product.

10. The process of claim 9 wherein the unetherified reaction mass is maintained within a temperature range of from about 18° C. to about 23° C.

WILEY MONROE BRANAN.
GILD EDWARD DESETTI.

References Cited in the file of this patent

UNITED STATES PATENTS

| Number | Name | Date |
|---|---|---|
| 2,137,343 | Maxwell | Nov. 22, 1938 |
| 2,163,869 | Collings et al. | June 27, 1939 |
| 2,201,663 | Ellsworth et al. | May 21, 1940 |
| 2,294,666 | Jahrstorfer et al. | Sept. 1, 1942 |